United States Patent [19]

Yasunaga et al.

[11] Patent Number: 4,723,595
[45] Date of Patent: Feb. 9, 1988

[54] HEAT EXCHANGER USING HYDROGEN STORAGE ALLOY

[75] Inventors: Takashi Yasunaga, Tokyo; Jotaro Itoh; Akira Yanoma, both of Yokohama; Takaharu Nitta, Tokyo; Kotaro Chiba; Masaji Yoneta, both of Muroran; Sakio Inoue, Muroran, all of Japan

[73] Assignees: Chiyoda Chemical Engineering Construction Co., Ltd., Yokohama; Japan Steel Works, Tokyo, both of Japan

[21] Appl. No.: 890,557

[22] Filed: Jul. 30, 1986

[30] Foreign Application Priority Data

Aug. 2, 1985 [JP] Japan .................. 60-170893

[51] Int. Cl.$^4$ .............................................. F25B 17/08
[52] U.S. Cl. .................... 165/104.12; 62/48; 62/480
[58] Field of Search ............. 165/104.12; 62/48, 480

[56] References Cited

U.S. PATENT DOCUMENTS 1,814,358  7/1931  Wright .
2,287,172  6/1942  Harrison et al. .
4,203,711  5/1980  Podgorny et al. .

FOREIGN PATENT DOCUMENTS 53737    6/1982  European Pat. Off. ....... 165/104.12
0061191  9/1982  European Pat. Off. .
0064562  11/1982 European Pat. Off. .
1328825  4/1963  France .
2558578  7/1985  France .
68448    6/1978  Japan ..................... 165/104.12
264859   6/1927  United Kingdom .
530061   12/1940 United Kingdom .

Primary Examiner—Albert W. Davis, Jr.
Attorney, Agent, or Firm—Stephen F. K. Yee

[57] ABSTRACT

A heat exchanger using two hydrogen storage alloys, including: a tubular housing member disposed in a horizontal position; a vertical partition plate extending axially within the housing member for partitioning the inside space of the housing member into two, first and second reaction zones in which the first and second alloys are contained, respectively, to form an upper space above each alloy; first and second heat-exchange tubes disposed in the first and second reaction zones, respectively, and arranged so that first and second fluids may be passed therethrough for indirect heat exchange with the first and second alloys, respectively; openings provided in the vertical partition plate at least at positions so that the upper space in the first and second reaction zones are in fluid communication with each other; and a plurality of vertically extending gas passages provided in each of the first and second reaction zones, and each being in fluid communication with the upper space, whereby hydrogen gas released from one of the first and second alloys can efficiently diffuse in the other alloy.

4 Claims, 3 Drawing Figures

HEAT EXCHANGER USING HYDROGEN STORAGE ALLOY

This invention relates to a heat exchanger of a type which utilizes reversible, exothermic reaction between a hydrogen storage alloy and hydrogen.

Heat exchangers of the above-mentioned type have been hitherto used as chemical heat pumps for use in heaters, coolers, refrigerators and so on. Japanese Published Unexamined patent application No. 57-136067 discloses a heat exhanger having a vessel divided by a hydrogen-permeable partition member into two, first and second chambers in which first and second heat transfer tubes and first and second hydrogen storage alloys are disposed, respectively. In operation, a hot waste water is passed through the first heat transfer tube of the first reaction chamber to heat the first alloy, which has absorbed hydrogen, to desorb the hydrogen. The desorbed hydrogen is passed through the partition member to the second chamber where the hydrogen is absorbed by the second alloy with the simultaneous generation of reaction heat which is transferred to a liquid flowing through the second tube. The heat exchanger can also produce a cooled liquid by utilizing the absorption of heat which takes place upon desorption of absorbed hydrogen of the alloy.

The conventional heat exchanger has a drawback that hydrogen gas is not swiftly passed through or diffused into the packed mass of the alloy. Therefore, it is not possible to use the heat exchanger in practice where the absorption and desorption of hydrogen must be effected on a large scale. Thus, there is a great demand for a heat exchanger which has a high heat exchange efficiency.

In accordance with the present invention there is provided a heat exchanger using two, different, first and second hydrogen storage alloys, each capable of exothermically absorbing hydrogen to form a hydride which reversibly and endothermically releases the absorbed hydrogen, comprising:

a tubular housing member disposed in a horizontal position;

a vertical partition means extending axially within said housing member for partitioning the inside space of said housing member into two, first and second reaction zones in which the first and second alloys are contained, respectively, in an amount so that an upper space is defined in each reaction zone above each alloy;

first and second heat-exchange tubes disposed in said first and second reaction zones, respectively, and arranged so that first and second fluids may be passed therethrough for indirect heat exchange with said first and second alloys, respectively;

openings provided in said vertical partition means at least at positions so that the upper space in said first reaction zone is in fluid communication with the upper space in said second reaction zone; and a plurality of vertically extending gas passage means provided in each of the first and second reaction zones, each being in fluid communication with the upper space, whereby hydrogen gas released from one of the first and second alloys can efficiently diffuse in the other alloy.

The present invention will now be described in detail below with reference to the accompanying drawings, in which.

Figure 1:
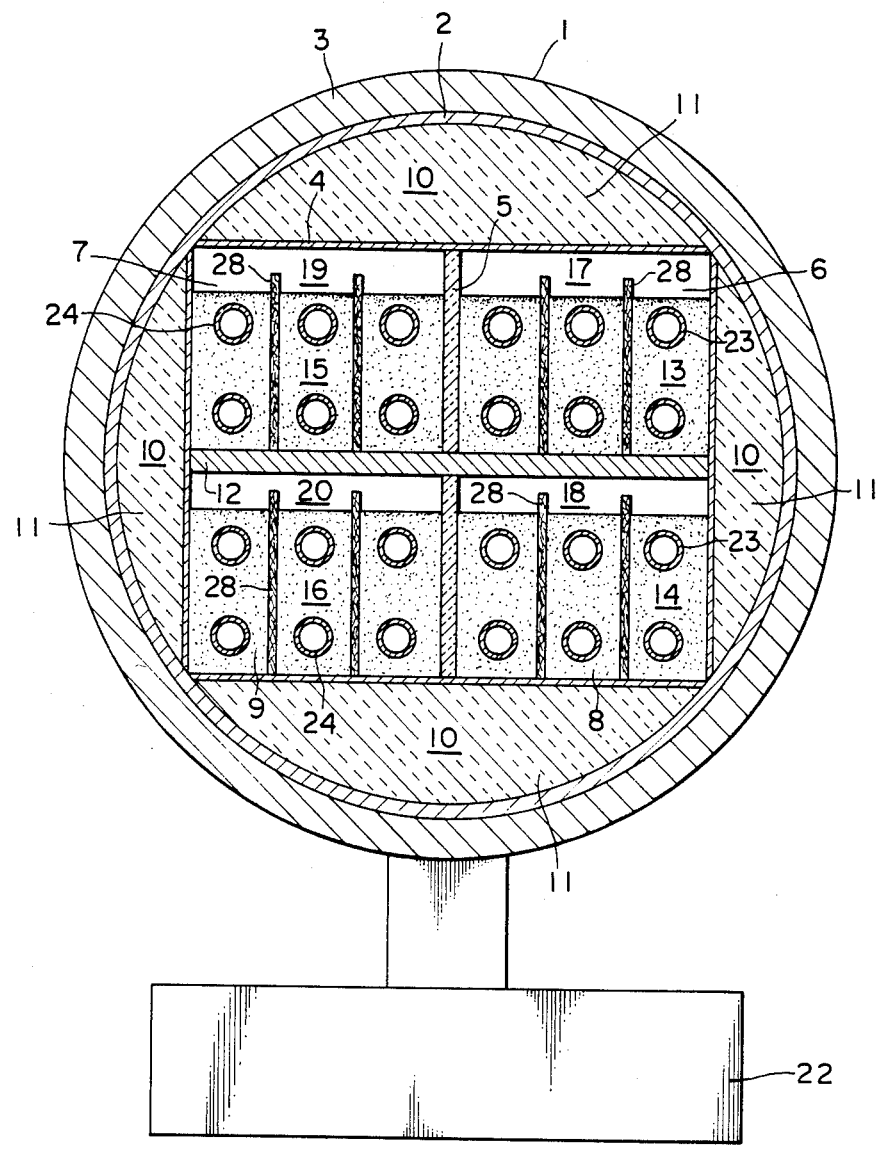
FIG. 1 is a vertical cross-sectional view diagrammatically showing one preferred embodiment of the heat exchanger according to the present invention.

Referring now to FIG. 1, the reference numeral 1 designates a generally tubular, preferably cylindrical housing member generally held in a horizontal position by any suitable support member 22. The housing member 1 is composed of an inner tubular reaction vessel 2 and an outer protective vessel 3 surrounding the inner vessel 2.

Disposed coaxially within the tubular housing member 1 is an inner tubular housing member 4 generally having a rectangular cross-section to define therebetween a peripheral space 10. The space 10 is filled with a suitable filler 11. The inner tubular housing member 4 is prefereably lined with a heat insulating material.

A vertical partition member 5 extends axially within the inner housing member 4 to partition the inside space of the inner housing member 4 into laterally spaced first and second reaction zones 6 and 7 in which first and second hydrogen storage alloys 8 and 9 having different free energies of the hydrogen dissociation are contained, respectively. The kinds of alloys used can be suitably determined in consideration of the mode of operation and object of use of the heat exchanger.

One or more (one in the particular embodiment shown) horizontal partition member 12 extends axially within the inner housing member 4 to partition each of the first and second reaction zones 6 and 7 into a plurality (two in the particular embodiment shown) of vertically spaced reaction chambers 13 and 14, and 15 and 16. The first alloy 8 is contained in each of the chambers 13 and 14 and the second alloy is contained in each of the chambers 15 and 16 in such a manner as to define an upper space 17, 18, 19 and 20 in respective chambers 13 through 16 above the respective alloys.

The vertical partition member 5 has openings, in least at an upper portion of each chamber 13-16 so that the upper spaces 17 and 18 are in fluid communication with the upper spaces 19 and 20, respectively. As the vertical partition member 5, there may be used a porous plate having a multiplicity of evenly distributed holes, a perforated plate having perforations only at upper portions located in the upper spaces, or a perforated plate having perforations at upper, middle and lower portions of respective chambers. It is preferred that the vertical partition member 5 be heat insulating so as to prevent heat transfer, by conduction therethrough, between the first and second alloys 8 and 9.

First and second tubes 23 and 24, such as heat conducting metal tubes provided with fins, are disposed in the first and second reaction zones 6 and 7, respectively, through which first and second fluids are passed, respectively, for indirect heat exchange with the first and second alloys 8 and 9, respectively.

A plurality of vertically extending gas passages 28 are provided within each of the chambers 13, 14, 15 and 16 for fluid communication with respective upper space 17 through 20 and to facilitate the transfer of hydrogen between the first and second hydrogen storage alloys. The gas passages 28 may be formed of a material which allows hydrogen gas to flow therethrough in any direction, for example, a fibrous material such as asbestos, glass fiber, metal fiber or synthetic plastics fiber. Plates or rods composed of fibrous core materials surrounded by suitable reinforcing members, such as porous plates or rods and wire nets, are suitable examples of the gas passages 28. Hollow porous or perforated plates or pipes formed of a porous material or a metal may also be used. The gas passages 28 generally protrude from the bed of the hydrogen storage alloy into the upper space above the bed. This is not essential, however. The passages 28 may be terminated in the upper portion of the bed of the alloy as long as the hydrogen gas in the passages 28 can be flown smoothly to the upper space or vice versa.

Figure 2:
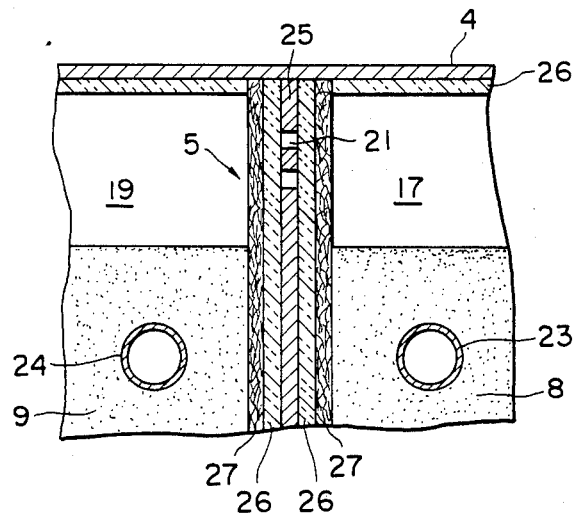
FIG. 2 is an enlarged fragmentary cross-section showing an upper portion of the vertical partition member of FIG. 1.

A preferred example of the vertical partition member 5 is illustrated in FIG. 2, in which the same component parts are designated by similar reference numerals. The partition member 5 in this embodiment is composed of a partition plate 25 formed of a metal, ceramics or the like, and two heat insulating plates 26 are provided, one on each side of the partition plate 25. The partition plate 25 has openings 21 at its upper portion. The heat insulating plate 26 may be formed of asbestos or any other conventionally used heat-insulating material. The insulating plates 26, when formed of a gas-impermeable material, may be cut away at a portion adjacent to the openings 21 of the plate 25. Designated as 27 is a gas passage, similar to the above described vertical passages 28, to allow hydrogen gas to uniformly and swiftly diffuse in the beds of the alloys 8 and 9.

Figure 3:
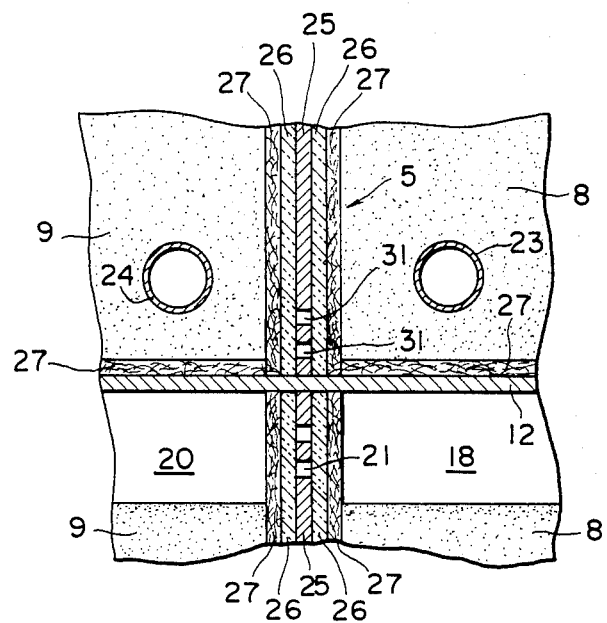
FIG. 3 is an enlarged fragmentary cross-section showing a portion of the vertical partition member of FIG. 1 which crosses a horizontal partition member.

FIG. 3 shows an embodiment of the horizontal partition member 12, in which the same component parts are designated by similar reference numerals. The horizontal partition member 12 is generally gas-impermeable and is formed of a metal, ceramic or plastic. However, a gas-permable plate can be used as the horizontal partition member 12, if desired. Openings 21 and 31 are provided in the vertical partition plate 25, just beneath and above the horizontal partition plate 12. A gas passage 27 similar to the passages 28 is provided over the surface of the horizontal member 12 as well as the vertical partition member 5.

As described previously, the peripheral space 10 defined between the outer housing member 1 and inner housing member 4 is preferably filled with a filler such as a cement, light weight concrete or plastic material. As a result of the provision of the inner housing member 4, unavailing space can be removed and the hydrogen storage alloys 8 and 9 can be provided only in the vicinity of the heat exchange tubes 23 and 24. Therefore, the diffusion and transfer of hydrogen gas, i.e. the increase or decrease of the hydrogen pressure, which occur in response to the supply and withdrawal of heat, can be efficiently and swiftly effected so that the heat exchange efficiency is improved. Further, the filler 11 within the space 10 serves to act as a reinforcement of the inner housing 4 and as a heat insulator for preventing heat transfer between the reaction zones 6 and 7 and air. In addition, since the filler 11 can reduce open space, the lowering of the heat exchange efficiency resulting from the breakage of the inner housing member 4 can be minimized.

The above described heat exchanger according to the present invention has an additional merit in that it is easily fabricated. Thus, the inner vessel 2 is inserted into the pressure resisting protective vessel 3 to form the outer housing member 1. If desired, an intermediate, heat insulating layer may be provided between the vessels 3 and 2. Thereafter, the inner housing member 4 accomodating necessary parts and elements therein is inserted in the housing 1, followed by the packing of the filler 11, mounting of a lid to cover an open end of the housing 1 and joining of the necessary pipings including the tubes 23 and 24. Since the inner vessel 2 is not required to have a pressure resistivity, it may be formed of an easy to work material such as a relatively thin metal plate, e.g. a carbon steel or a stainless steel. The protective vessel 3 should be pressure resisting and may be formed, for example, from a metal pipe or rolled metal plate such as a steel pipe or a rolled steel pipe with a relatively large wall thickness.

One example of the operation of the heat exchanger according to the present invention used as a heat pump for space heating will be described below. The first hydrogen storage alloy 8 which undergoes hydrogen absorbing reaction at a high temperature is contained in the first reaction chambers 13 and 14, while the second hydrogen storage alloy 9 which undergoes hydrogen-releasing reaction at a low temperature is contained in the second reaction chambers 15 and 16. A second fluid with a low grade thermal energy is flown through the second tubes 24 to supply a heat to the second alloy 9 so that hydrogen is continuously released from the second alloy. The released hydrogen is flown through the gas passages 28, the upper spaces 19 and 20, and openings 21 into the first chambers 13 and 14 and is diffused into and absorbed by the first alloy 8. The heat of the absorption of the first alloy 8 is transferred to a first fluid flowing through the first tubes 23 and is utilized for space heating.

In regenerating the first and second alloys 8 and 9, a cooling fluid is fed to the second tubes 24 to cool the second alloys 9 while a heating fluid is fed to the first tubes 23 for heating the first alloy 8. By cooling the second alloy 9, the pressure in the second reaction chambers 15 and 16 are lowered as a result of the absorption of hydrogen by the second alloy 9. Since the pressure in the first chambers 13 and 14 which are in fluid communication with the second chambers 15 and 16, respectively, becomes also lowered, the first alloy 8 in the form of a hydride releases hydrogen. The released hydrogen is transferred to the second chambers 15 and 16 and absorbed by the second alloy 9. The heat generated by the exothermic reaction (hydrogen absorption) of the alloy 9 is withdrawn by heat exchange with the cooling fluid in the second tubes 24.

In the heat exchanger according to the present invention, hydrogen gas released from one hydrogen storage alloy is swiftly collected in the gas passages 28 without being entrapped within the bed of the alloy. Therefore, the heat exchange between the alloy and a fluid in tubes disposed within the bed is efficiently conducted. Further, the released hydrogen is evenly and swiftly diffused in and absorbed by the other hydrogen storage alloy because of the provision of the gas passages 28. Therefore, the entire alloy effectively undergoes exothermic hydrogen-absorbing reaction and the heat generated as a result of the hydrogen absorption is efficiently used for heating a fluid in the tubes. Accordingly, the heat exchange efficiency attained by the present invention is much higher as compared with a heat exchanger without such gas passages. In addition, the double wall structure of the housing member 1 makes it easy to construct the heat exchanger. The provision of the inner housing member 4, the gas passage 27 and horizontal partition member 12 also contributes the improvement in heat exchange efficiency.

By connecting two or more heat exchangers in parallel, it is possible to continuously operate the desired process such as heating or cooling of space. A continuous operation is also attained by using a heat accumulator in combination with the heat exchanger. The heat exchanger according to the present invention lends itself to many applications such as a chemical heat pump for use in cooling, heating or energy conversion and a hydrogen storage tank.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat exchanger using two, different, first and second hydrogen storage alloys, each capable of exothermically absorbing hydrogen to form a hydride which reversibly and endothermically releases the absorbed hydrogen, comprising:
    a tubular housing member disposed in a horizontal position and having an inner, air-tight tubular vessel and an outer, pressure resisting tubular protective vessel surrounding the inner vessel;
    an inner tubular housing member having a rectangular cross section and disposed coaxially within said inner tubular vessel to define a peripheral space therebetween;
    a vertical partition means extending axially within said inner housing member for partitioning the inside space of said inner housing member into two, first and second reaction zones in which the first and second alloys are contained, respectively, in an amount so that an upper space is defined in each reaction zone above each alloy;
    first and second heat-exchange tubes disposed in said first and second reaction zones, respectively, and arranged so that first and second fluids may be passed therethrough for indirect heat exchange with said first and second alloys, respectively;
    openings provided in said vertical partition means at least at positions so that the upper space in said first reaction zone is in fluid communication with the upper space in said second reaction zone; and
    a plurality of vertically extending gas passage means provided in each of the first and second reaction zones and each being in fluid communication with the upper space, whereby hydrogen gas released from one of the first and second alloys can effectively diffuse in the other alloy.

2. A heat exchanger as claimed in claim 1, wherein said peripheral space is filled with a heat insulating material.

3. A heat exchanger as claimed in claim 1, further comprising at least one first means extending horizontally within said first reaction zone for partitioning said first reaction zone into a plurality of vertically spaced, first reaction chambers in each of which the first alloy is placed to a height so that an upper space is defined in each of said first reaction chambers above the first alloy; and second means corresponding in number to the number of said first means and extending horizontally from said first means within said second reaction zone for partitioning said second reaction zone into a plurality of vertically spaced, second reaction chambers in each of which the second alloy is placed to a height so that an upper space is defined in each of said second reaction chambers above the second alloy, said openings being provided at least at portions so that the upper space in each first chamber is in fluid communication with the upper space of an adjacent, corresponding second chamber.

4. A heat exchanger as claimed in claim 1, wherein said vertical partition means includes a metal plate, and a heat insulating plate provided on each side of said metal plate.

* * * * *